United States Patent [19]

Wataya et al.

[11] Patent Number: 5,003,627
[45] Date of Patent: Mar. 26, 1991

[54] IMAGE FILE SYSTEM

[75] Inventors: Masafumi Wataya; Hiroaki Ishii, both of Tokyo, Japan

[73] Assignee: Canon Kabushiki Kaisha, Tokyo, Japan

[21] Appl. No.: 503,125

[22] Filed: Apr. 2, 1990

Related U.S. Application Data

[63] Continuation of Ser. No. 196,787, May 18, 1988, abandoned, which is a continuation of Ser. No. 772,163, Sep. 3, 1985, abandoned.

[30] Foreign Application Priority Data

| Sep. 7, 1984 [JP] | Japan | 59-186490 |
| Sep. 7, 1984 [JP] | Japan | 59-186491 |
| Sep. 18, 1984 [JP] | Japan | 59-193874 |

[51] Int. Cl.⁵ .............................................. G06K 9/20
[52] U.S. Cl. ........................................ 382/58; 382/61; 355/308; 355/317
[58] Field of Search ............... 235/475, 476; 271/291, 271/298, 301, 311; 382/57, 58, 61, 62, 65; 355/308, 317, 319, 320, 205, 207

[56] References Cited

U.S. PATENT DOCUMENTS

| 4,099,150 | 7/1978 | Connin | 355/320 |
| 4,229,100 | 10/1980 | Travis | 271/291 |
| 4,417,282 | 11/1983 | Yamamoto | 358/296 |
| 4,494,861 | 1/1985 | Tachika et al. | 355/14 C |
| 4,505,576 | 3/1985 | Sugiura et al. | 355/14 C |
| 4,511,242 | 4/1985 | Ashbee et al. | 355/319 |
| 4,533,959 | 8/1985 | Sakurai | 382/46 |
| 4,557,587 | 12/1985 | Komiya et al. | 355/14 C |

Primary Examiner—Leo H. Boudreau
Assistant Examiner—Jose L. Gouso
Attorney, Agent, or Firm—Fitzpatrick, Cella, Harper & Scinto

[57] ABSTRACT

There is disclosed an image file system with automatic original feeder, capable of avoiding incorrect image recording caused by double feeding or oblique feeding of originals. Such originals are automatically detected, separated without interrupting the continuous feeding of originals and read again for image recording after other originals have been read.

11 Claims, 14 Drawing Sheets

FIG. 11A
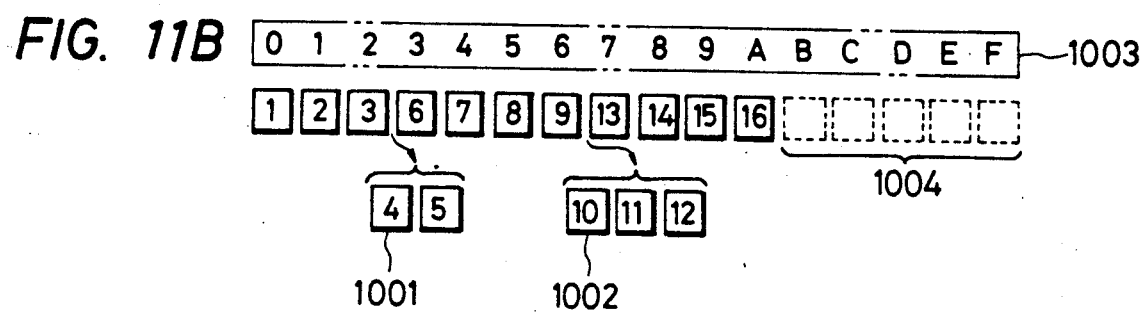
FIG. 11B
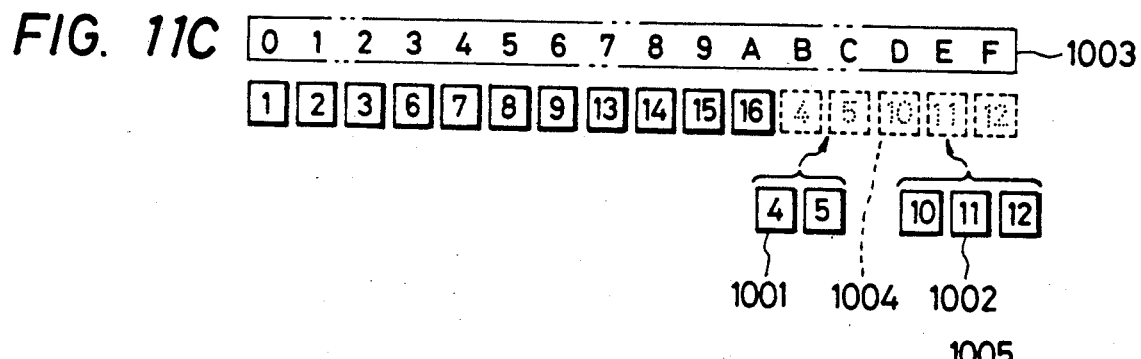
FIG. 11C
FIG. 11D
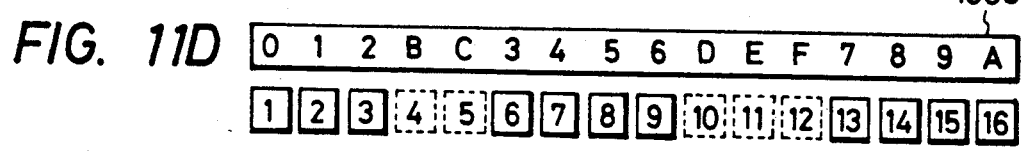

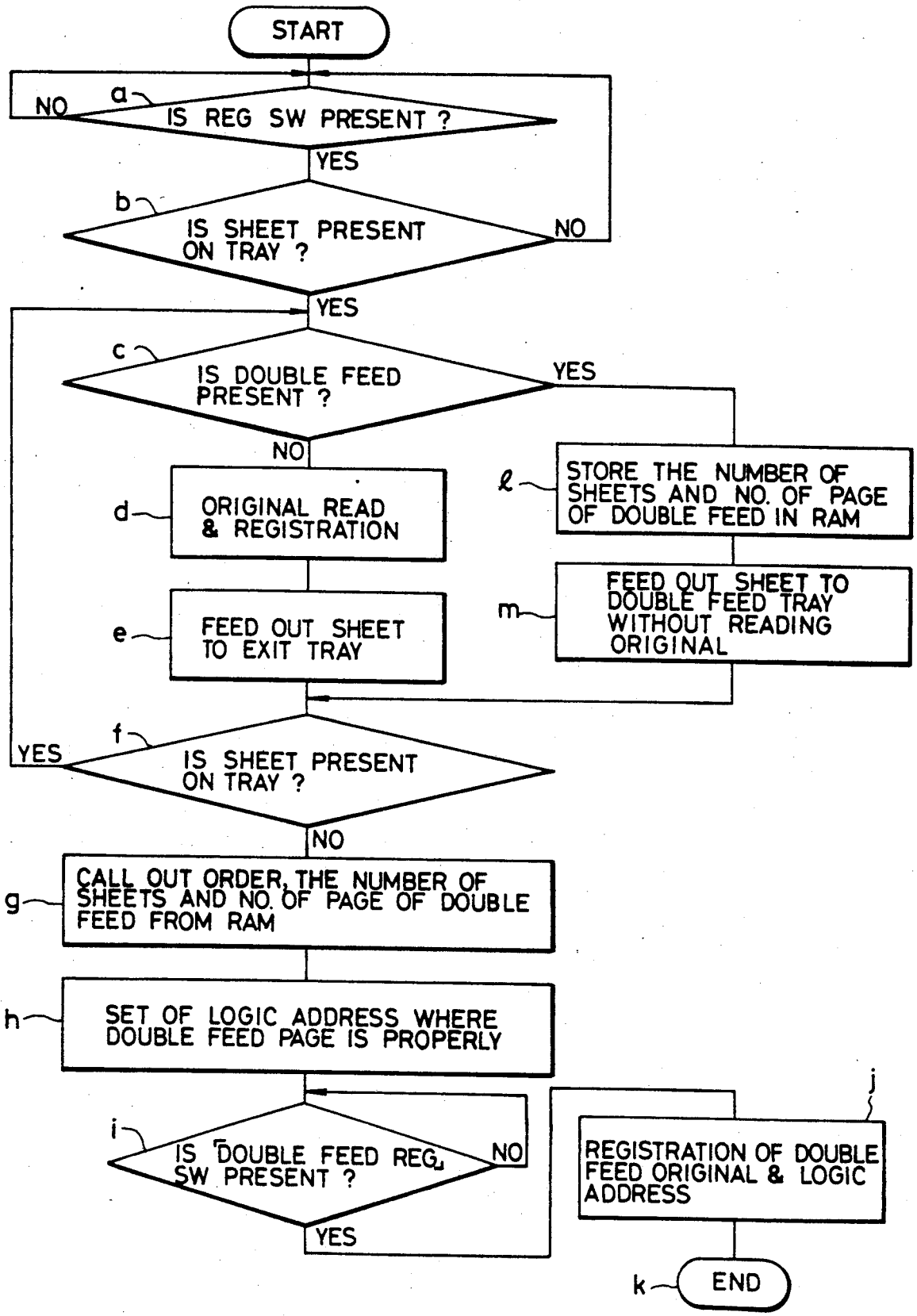

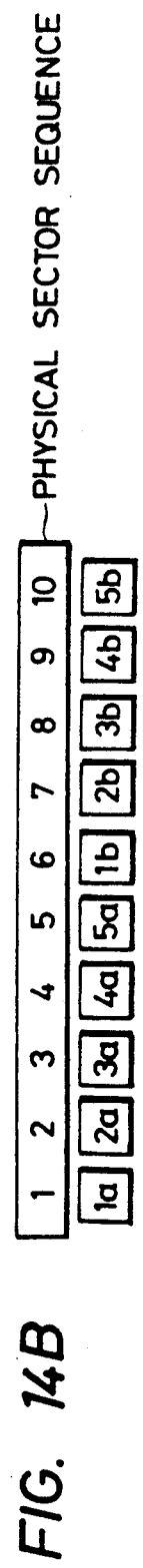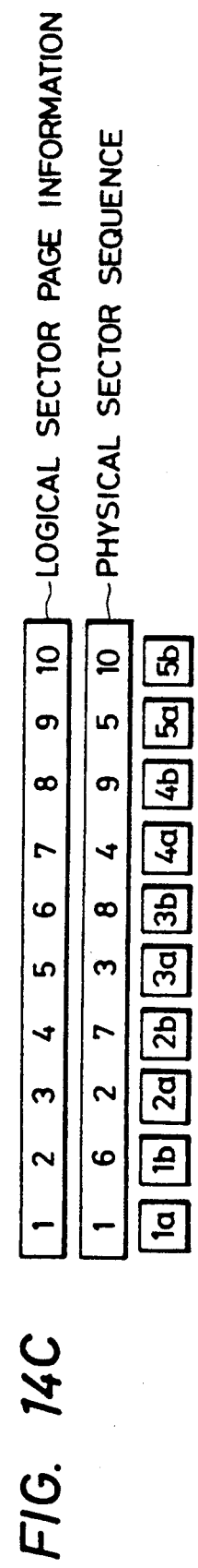
FIG. 14A
FIG. 14B
FIG. 14C

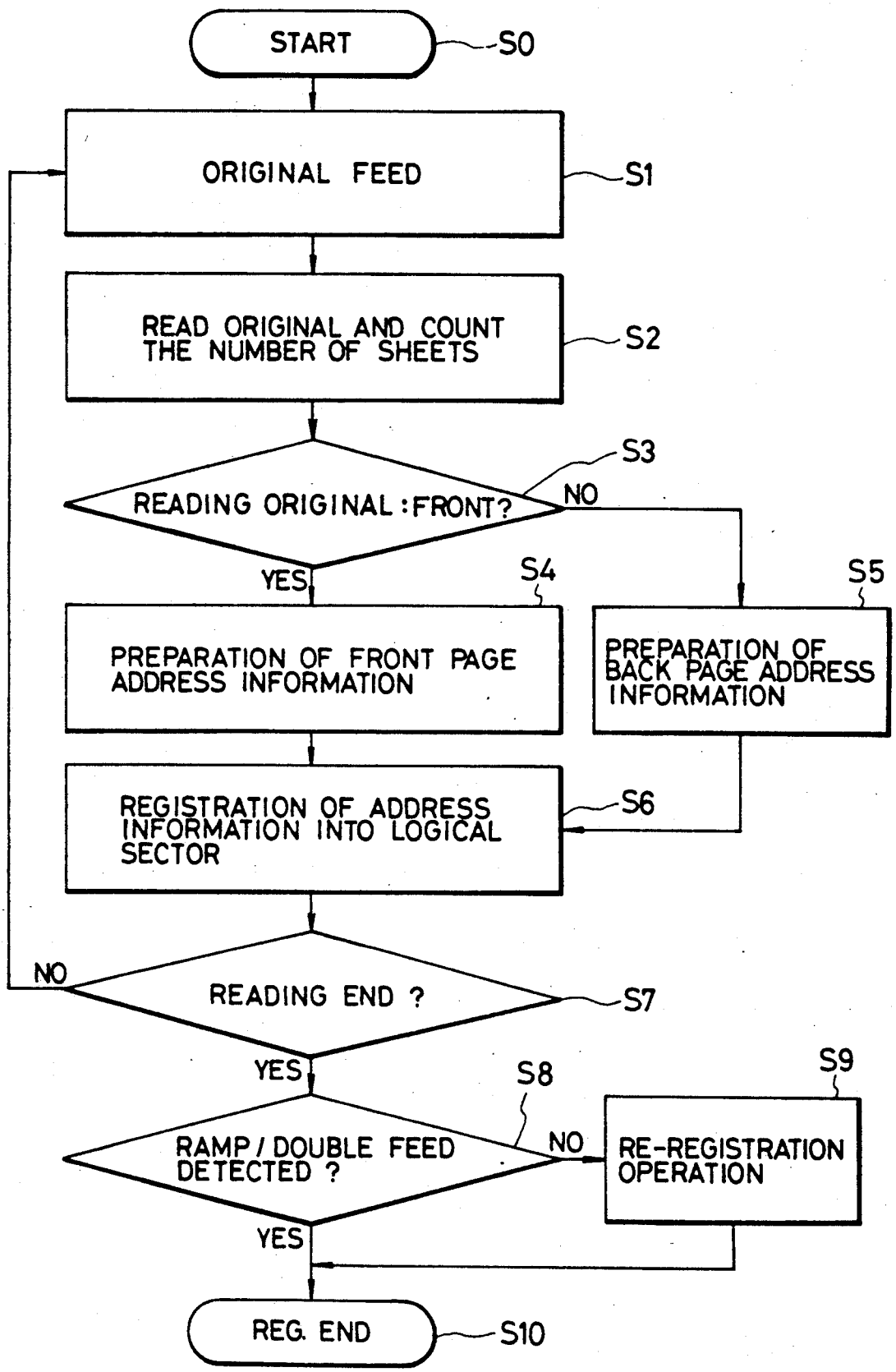

IMAGE FILE SYSTEM

This application is a continuation of application Ser. No. 196,787 filed May 18, 1988, which is a continuation of Ser. No. 772,163, filed Sept. 3, 1985, both now abandoned.

BACKGROUND OF THE INVENTION

Field of the Invention

The present invention relates to an image file system such as an electronic file system provided with memory means such as an optical disk.

DESCRIPTION OF THE PRIOR ART

There have recently been commercialized electronic file systems utilizing a large-capacity memory such as the optical disk, but such systems have lacked an adequate data input method suitable for the very large memory capacity.

In order to meet such requirement, there is being developed a system in which the data input speed of the large capacity memory is made higher and an automatic sheet original feeder as already used in electronic copying machines is employed for achieving automatic continuous feeding of the sheet originals bearing data to be filed, thus facilitating the data input operation.

However, in such automatic sheet original feeder in which an original is ejected upon completion of exposure thereof, the image information may be incorrectly filed since the filing of image information is not necessarily completed when the exposure of the original is completed.

Also such conventional automatic sheet original feeder is often unable to detect feeding failure of originals such as double feeding or a skewed original in feeding, so that such originals are read and the images are filed in such feeding failure state. Furthermore, even if such feeding failure is detected, it is extremely difficult to store the information of such original in the exact order of pages.

Furthermore, even though detecting means is provided for detecting such feeding failure it has been necessary to interrupt the continuous feeding operation of originals, to manually extract the incorrectly fed original for correcting the position thereof, and to re-start the feeding operation, and such procedure has been a major obstacle to achieving an easy and automatic feeding of originals.

As explained above, such conventional method of data input is still defective though improvements are being made for automating and facilitating data input with the automatic sheet original feeder, and is unable to fully exploit the high-speed performance and simplicity of such automatic feeder, as a manual procedure is required once feeding failure of original occurs. In this manner the above-mentioned method is unable to provide satisfactory work efficiency and to fully utilize the large capacity which is the principal advantage of electronic file systems.

SUMMARY OF THE INVENTION

In consideration of the foregoing, an object of the present invention is to provide an improved image file system.

Another object of the present invention is to provide an image file system capable of reading and storing image information without omission.

Still another object of the present invention is to provide an image file system capable, in filing image information by automatic continuous feeding of originals, of storing image information without interrupting said continuous feeding operation even if feeding failure of original occurs.

Still another object of the present invention is to provide an image file system capable, in filing image information by automatic continuous feeding of originals, of storing image information of a series of many originals through a simple operation even if feeding failure of original occurs.

Still another object of the present invention is to provide an image file system capable of automatically storing the information of both sides of an original.

Still another object of the present invention is to provide an image file system capable of retrieving the information of stored originals in the order of pages. The foregoing and still other objects of the present invention will become fully apparent from the following description.

BRIEF DESCRIPTION OF THE DRAWINGS

FIGS. 6(A) to (D) and FIG. 11(A) to (D) are views showing the mode of original reading process according to the present invention;

FIGS. 9 and 13 are flow charts showing an embodiment of controlling the automatic original feeding and reading;

FIGS. 14(A) to (C) are views showing the mode of original reading process according to the present invention;

FIG. 16 is a flow chart showing an example of operation control procedure according to the present invention.

DETAILED DESCRIPTION OF THE PREFERRED EMBODIMENTS

Now the present invention will be clarified in detail by reference to the preferred embodiments thereof, shown in the attached drawings.

Figure 1:
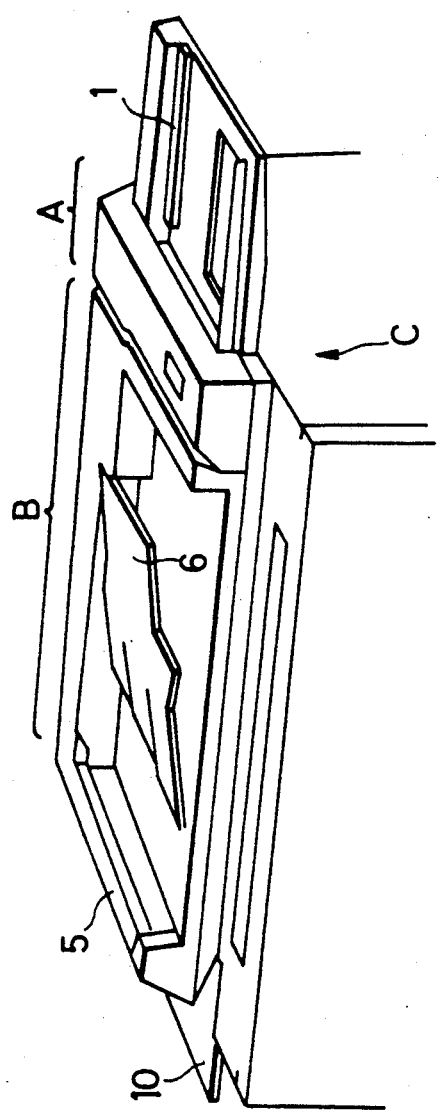
FIG. 1 is a perspective view of an automatic sheet original feeder embodying the present invention.
Figure 2:
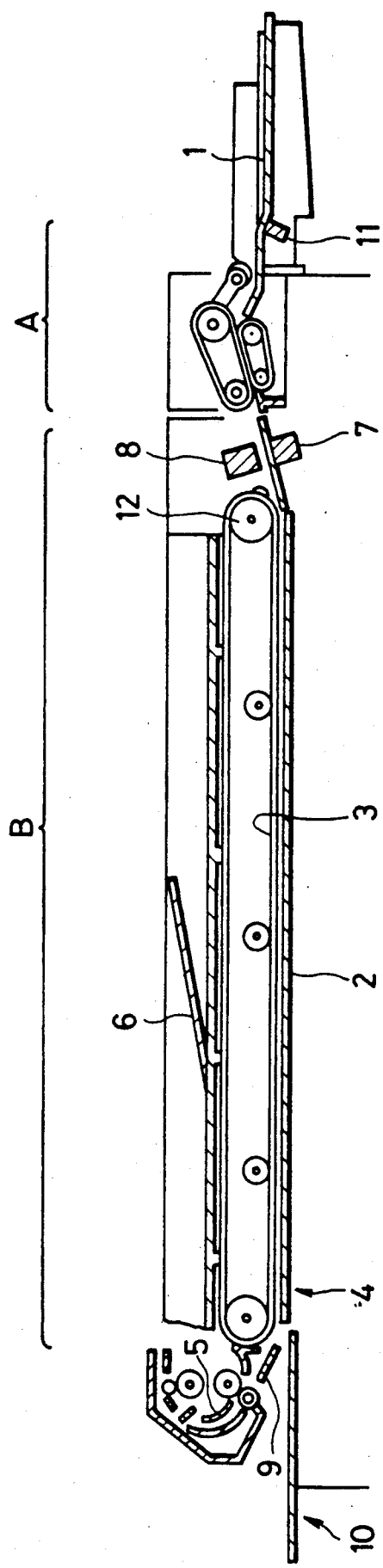
FIG. 2 is a longitudinal cross-sectional view thereof.

FIGS. 1 and 2 illustrate an automatic sheet original feeding and reading device embodying the present invention, wherein FIG. 1 is an external perspective view and FIG. 2 is a longitudinal cross-sectional view.

A two-dimensional scanning original reader C is provided with a platen 2 composed of a glass plate for supporting the original, fitted in a window provided in the upper face of an outer casing of said reader. Said platen 2 constitutes a part of an original exposure unit.

The automatic sheet original feeder is positioned above said platen 2, and is essentially composed of an original feeder unit A or original separation-transportation unit comprising a sheet original stacker 1, an original setter unit B, a normally fed original discharge tray 10, an original inverter 5, and a skew original discharge tray 6.

The original feeder unit A feeds, one by one, the originals stacked on the original stacker tray 1 with the image bearing faces thereof downwards, from the top of said stack, to the original setter unit B. There is provided a sheet sensor switch 11 for detecting whether an original is present on the stacker tray 1.

The original setter unit B comprises a pick-up roller mechanism 12 linked with the original feeder unit A and an endless conveyor belt 3 positioned in the vicinity of or in contact with the entire area of the upper face of the platen 2, whereby each original fed from the original feeder unit A is transported along the upper face of the platen 2 from right to left by means of the conveyor belt 3, until the leading end of the original reaches a reference position 4 on the platen 2. In this manner the original is transported to and set at a determined position on the platen 2.

In this state, the downward image bearing face of thus set original is read, through the transparent platen 2, by the original reader unit C. Subsequently the endless conveyor belt 3 of the original setter unit B is again activated to discharge the original from the platen 2 to the normally fed original discharge tray 10 positioned at left in the illustration.

The above-described cycle of original feeding is automatically repeated for each of a series of originals stacked on the original stacker tray 1, thus achieving continuous original reading for all of said originals. In the normal course of such image reading operation, a sheet discharge tray selector plate 9 is in the illustrated position, whereby the originals are transported to the sheet discharge tray 10.

At the start of the original transport path, there are provided, in a direction perpendicular to said path, two pairs of infrared emitters 8 and infrared sensors 7, positioned across said transport path. Thus the time difference between the moments when the front end of each original transported from the original stacker tray 1 passes said two pairs of infrared emitters 8 and infrared sensors 7, and a feeding of a skewed original is identified if said time difference exceeds a determined value.

Figure 4:
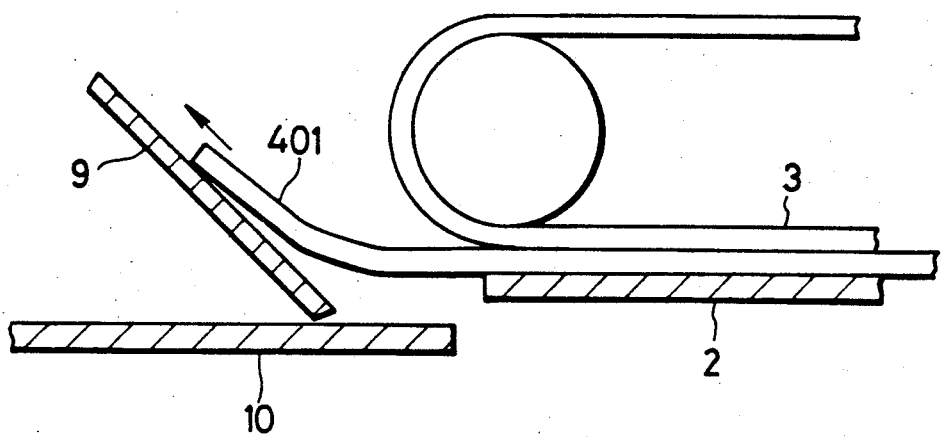

In the course of normal feeding of originals where said time difference does not exceed the determined value, the tray selector plate 9 is positioned high, so that the normally fed original 301 is discharged to the tray 10. On the other hand, if skew feeding is detected for an original, the reading operation is not conducted for such original and the tray selector plate 9 is lowered as shown in FIG. 4, whereby the skewed original 401 is guided along said selector plate 9 to the original inverter unit 5 and is transported to the sheet discharge tray 6 positioned above the original setter unit B. In this manner the skew originals are stacked on said tray, with the image bearing faces thereof upwards, in the order of occurrence of skew feedings.

Figure 5:
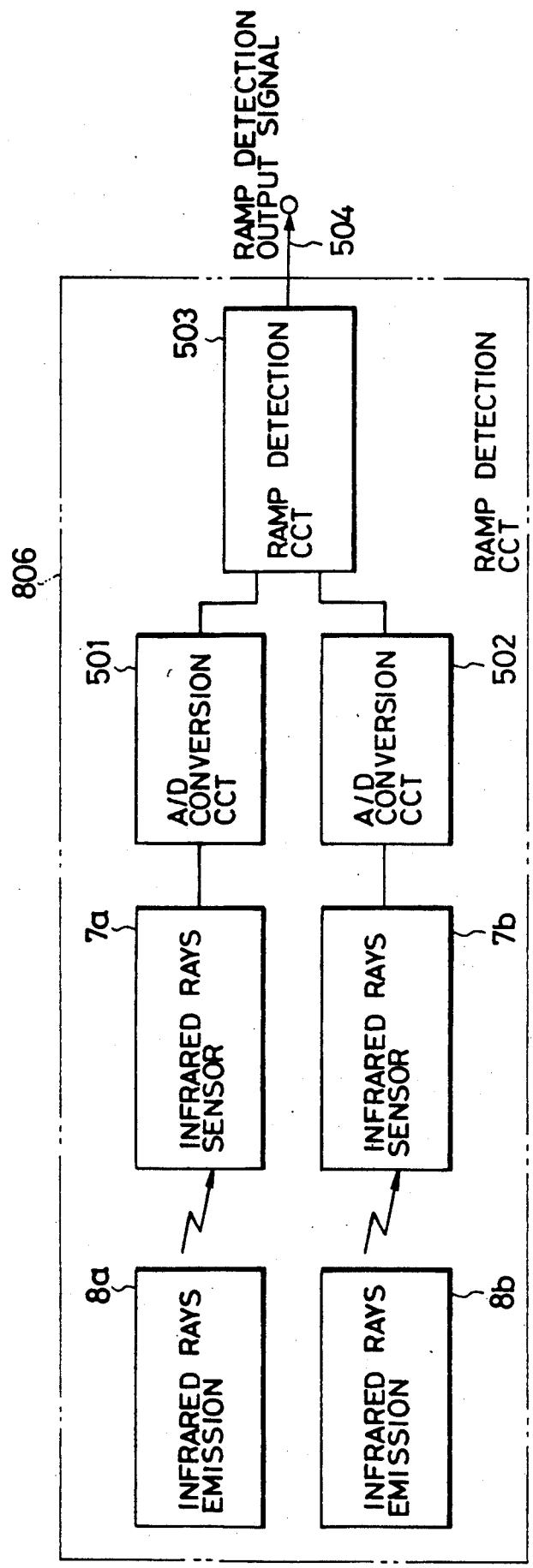
FIG. 5 is a block diagram showing an embodiment of a skewed original detecting circuit employed in said embodiment.

FIG. 5 shows an embodiment of a circuit for detecting the presence of skew feeding and counting the number of such occurrences according to the present invention.

In FIG. 5, two pairs of infrared emitters 8a, 8b and infrared sensors 7a, 7b, positioned in a direction perpendicular to and across the original feeding path, are composed of emitters of an infrared ray of high transmission and high-sensitivity sensors having a peak sensitivity in the infrared wavelength range.

The position of the original passing between said emitters 8a, 8b and sensors 7a, 7b is exactly detected by the difference in the moments of sheet passing between these pairs of emitters and sensors. Photoelectrically converted output signals from the infrared sensors 7a, 7b are respectively supplied to A/D converters 501, 502 for conversion into digital signals, which are supplied to a skew detector circuit 503, whereby the presence of skew feeding is detected and a skew detection output signal is supplied to a control line 504 when the difference in time of the output signals from said two pairs exceeds a determined value.

Now reference is made to FIG. 6(A) to (D) for explaining the mode of image data processing according to the present invention, in the case that skew feeding is detected in the course of feeding of a series of originals.

Figure 6A:
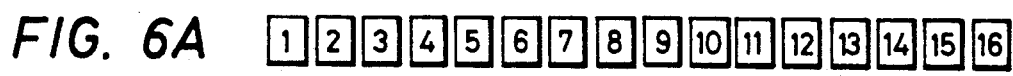
Figure 6B:
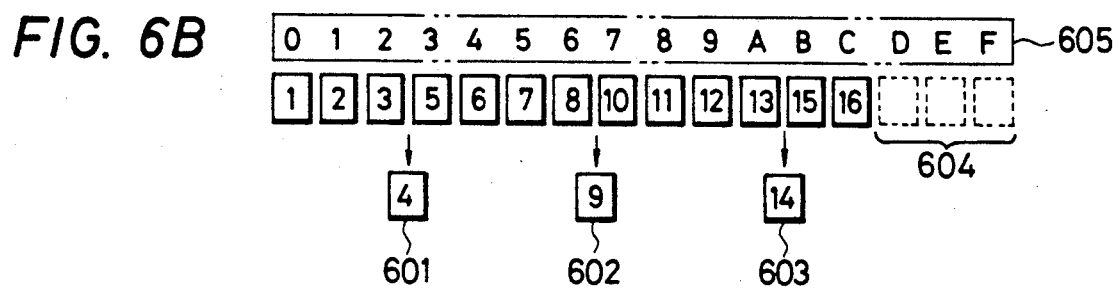

As an example, in case of feeding a series of originals (1)–(16) shown in FIG. 6(A) in succession for image reading by the two-dimensional image reader and storage in an optical disk, if the originals (4), (9) and (14) are skewed as shown in FIG. 6(B), said originals 601, 602, 603 are not subjected to the image reading operation and are stacked on the skew original discharge tray 6. Consequently the normally fed original discharge tray 10 contains other originals, with a vacancy 604 at the end.

On the other hand, a physical sector group 605, constituting a memory area of the optical disk for storing the image information obtained from said originals, stores the image information of the serial originals (1)–(16) except that of the skewed originals (4), (9), (14) respectively in serial physical sectors 0–9 and A–C, while leaving physical sectors (D)–(F) at the end vacant.

Figure 6C:
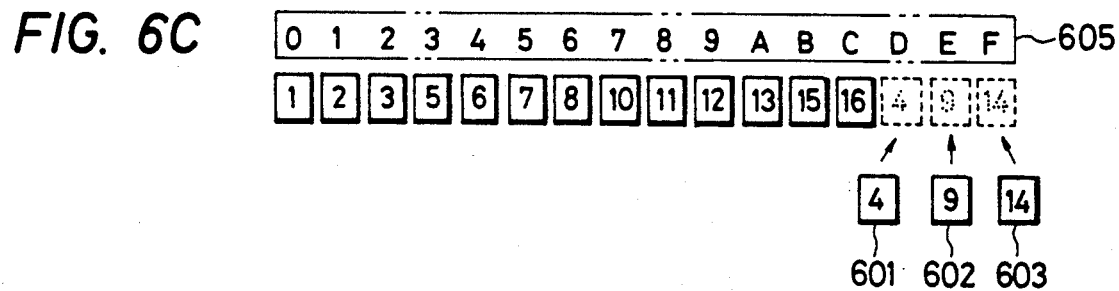

When the image storage for serial originals is completed in the above-explained manner, the originals (4), (9) and (14) stacked on the discharge tray 6 because of the skew feeding are transferred to the original stacker tray 1 and are subjected to the transport operation for repeating the above-explained original reading operation. Thus the originals (4), (9), (14) are stacked on the discharge tray 10, on top of the already read originals as shown in FIG. 6(C), and the corresponding image data are respectively stored in the physical sectors D, E, F left vacant in the physical sector group 605.

Figure 6D:
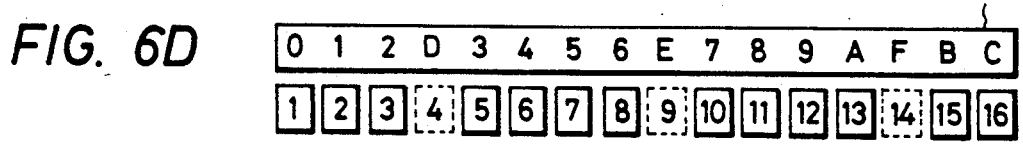

Consequently, in the case of retrieving the image information of the serial originals (1)–(16), it is possible to obtain said information in the order of pages, even if the order of image reading is distorted by skew feedings, by handling the physical sector group 606 with the memory addresses as shown in FIG. 6(D) for the image information stored in the order illustrated therein.

Figure 7:
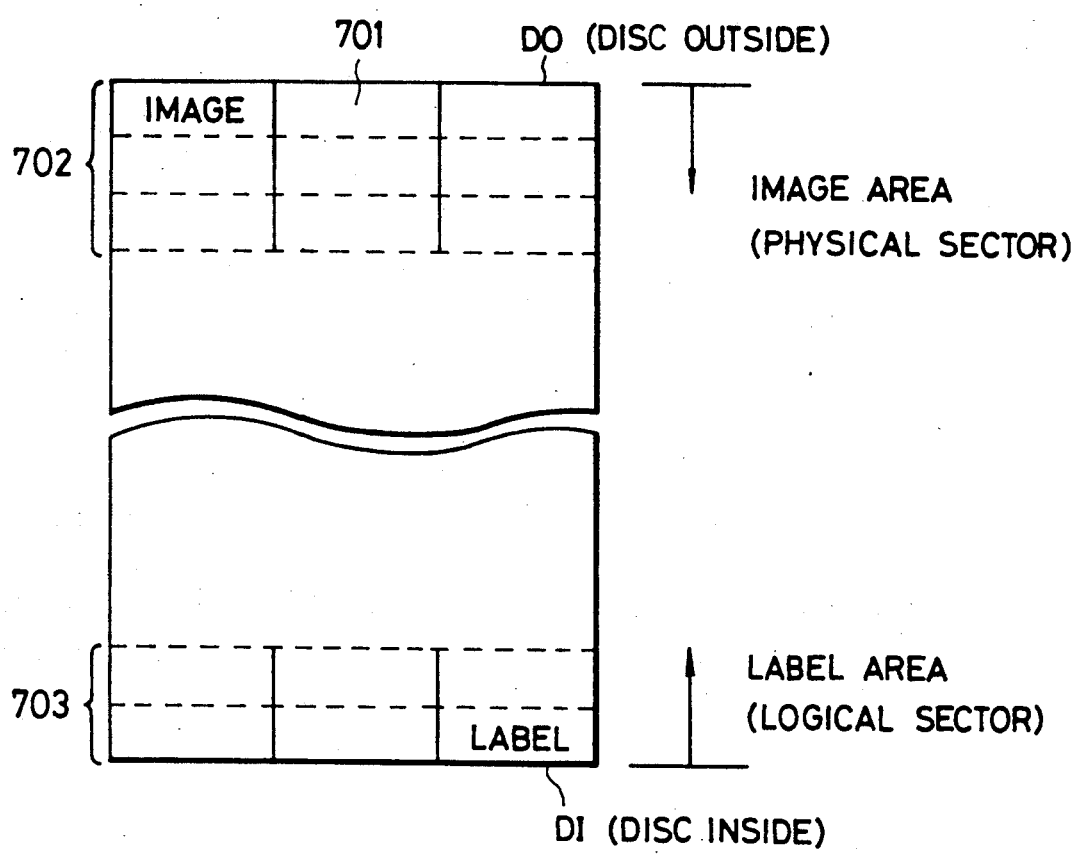
FIG. 7 is a view schematically showing the mode of image information storage in an optical disk in said process.

Now reference is made to FIG. 7 for explaining the mode of information storage such as image information on the above-mentioned optical disk.

In the memory medium of the optical disk, the information is controlled in the unit of a sector of a determined memory capacity. In FIG. 7, a minimum area defined by full lines and broken lines constitutes a sector 701.

The image information transmitted from the original reader unit is stored in succession in the sectors 701, starting from the outside DO of the optical disk, or from the upper end in FIG. 7. The area storing such image information is called an image area, and the sector 701 constituting such image area is called a physical sector.

On the other hand, control data concerning the image information of each original, such as the page number of a corresponding original in the serial originals and the address of the corresponding physical sector are stored in the successive sectors, starting from the inside of the optical disk, or from the lower end in FIG. 7. The area storing such control data is called a label area 703, and the sector 701 constituting such label area 703 is called a logic sector.

Figure 8:
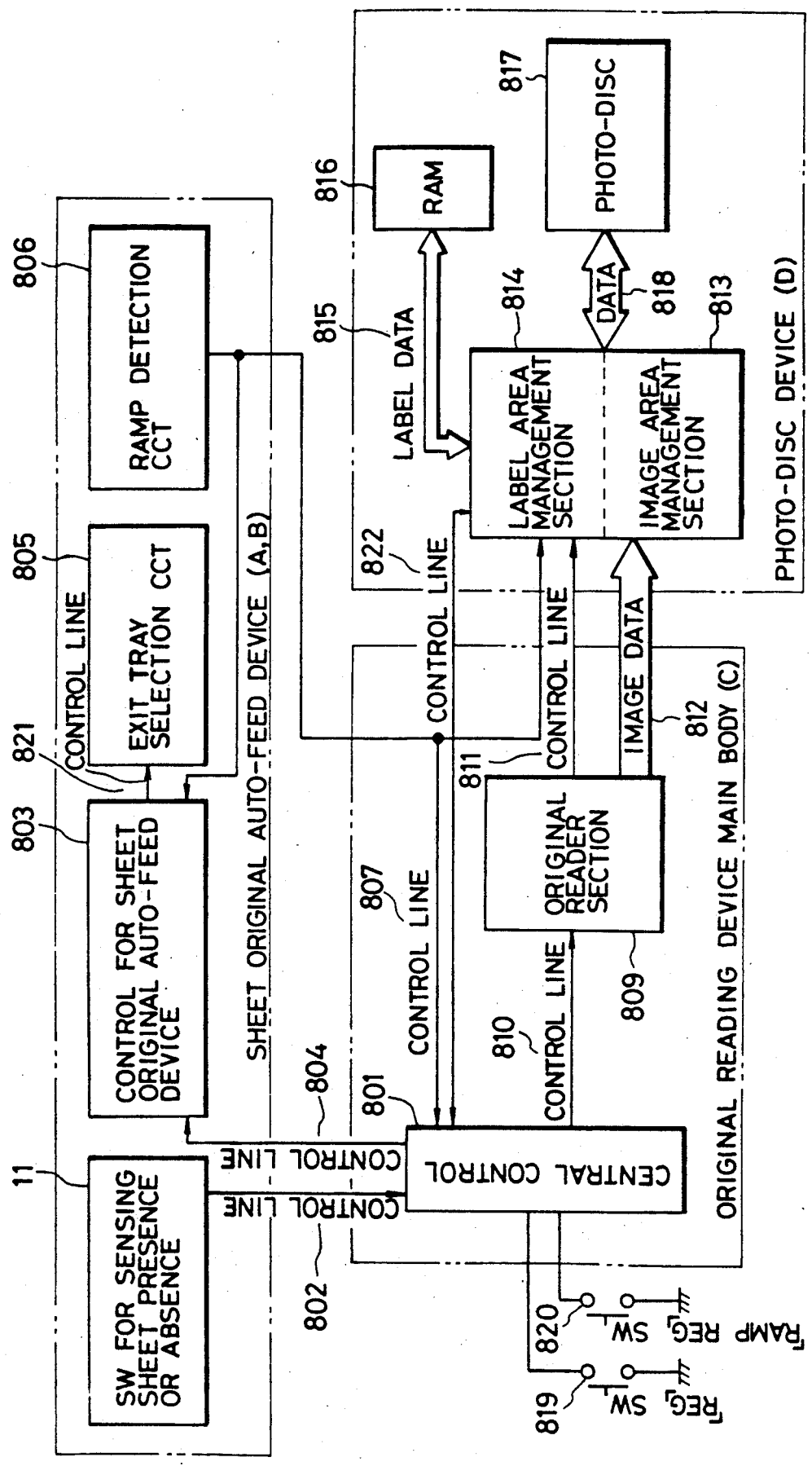
FIGS. 8 and 12 are block diagrams showing an automatic original feeding and reading circuit embodying the present invention.

FIG. 8 shows an embodiment of the circuit of the automatic original feeding and reading apparatus according to the present invention, in which the automatic sheet original feeder (A, B), original reader unit (C) and optical disk unit (D) are respectively represented by chain-lined frames.

In FIG. 8 there are shown a central control circuit 801 of the original reader unit (c); a sheet sensor switch 11 provided on the original stacker tray 1 as explained before; and a control line 802 from said sheet sensor switch 11 to the central control circuit 801.

There are also shown a control circuit 803 for the automatic sheet original feeder unit; a control line 804 from the central control unit 801 to the automatic sheet original feeder; a tray selecting circuit 805 for displacing the tray selector plate 9 according to whether the original on the platen 2 is skewed or not; a control line 821 from said control circuit 803 to said selecting circuit 805; and a skew original detecting circuit 806.

There are further shown a control line 807 from the skew original detecting circuit 806 to the automatic sheet original feeder control circuit 803, to the central control circuit 801 and a label area administering unit 814 to be explained later; an original reader unit 809; a control line 810 from the central control circuit 801 to the original reader unit 809; a control line 811 from the original reader unit 809 to the label area administering unit 814; and an image data bus 812 for transmitting image data from the original reader unit 809 to an image area administering unit 813 to be explained in the following.

There are further shown circuits 813, 814 for administering data respectively stored in the image area and label area of an optical disk device D; and a label data bus 815 between the label area administering unit 813 and a RAM 816 to be explained next.

A random access memory (RAM) 816 is provided for temporarily storing label data transmitted from the skew original detecting circuit 806 to the label area administering unit 814 through the control line 807, such as page numbers of skew originals and the order of occurrence of skew feedings.

There are further provided an optical disk device 817 comprising a recording medium and record-regenerating means; a data bus 818 between image/label area administering units 813, 814 and the optical disk device 817; and switches 819, 820 for initiating the registration of entire originals and skew originals, respectively.

In the above-described automatic original feeding and reading apparatus of the present invention, the central control circuit 801 is activated by the registration switch 819 or the skew registration switch 820 to control the automatic sheet original feeder A, B and the original reader unit C in response to the information from the sheet sensor switch 11. Thus the image information obtained by reading the originals fed in succession is transmitted to the image area administering unit 813 of the optical disk device D and stored in succession on the recording medium of the optical disk.

At the same time, in response to detection signals from the skew original detecting circuit 806, the sheet discharge tray selecting circuit 805 is controlled to separate the skew originals only. Then, after the image reading and storage are completed for the serial originals, the same operation is conducted for such skew originals, as already explained in relation to FIGS. 6(A)–(D), thus storing the image data of such skew originals in the order of image reading. The label area administering unit 814 controls address data of said storage in such a manner that the retrieval of the image information from the optical disk can be made in the order of pages.

Figure 9:
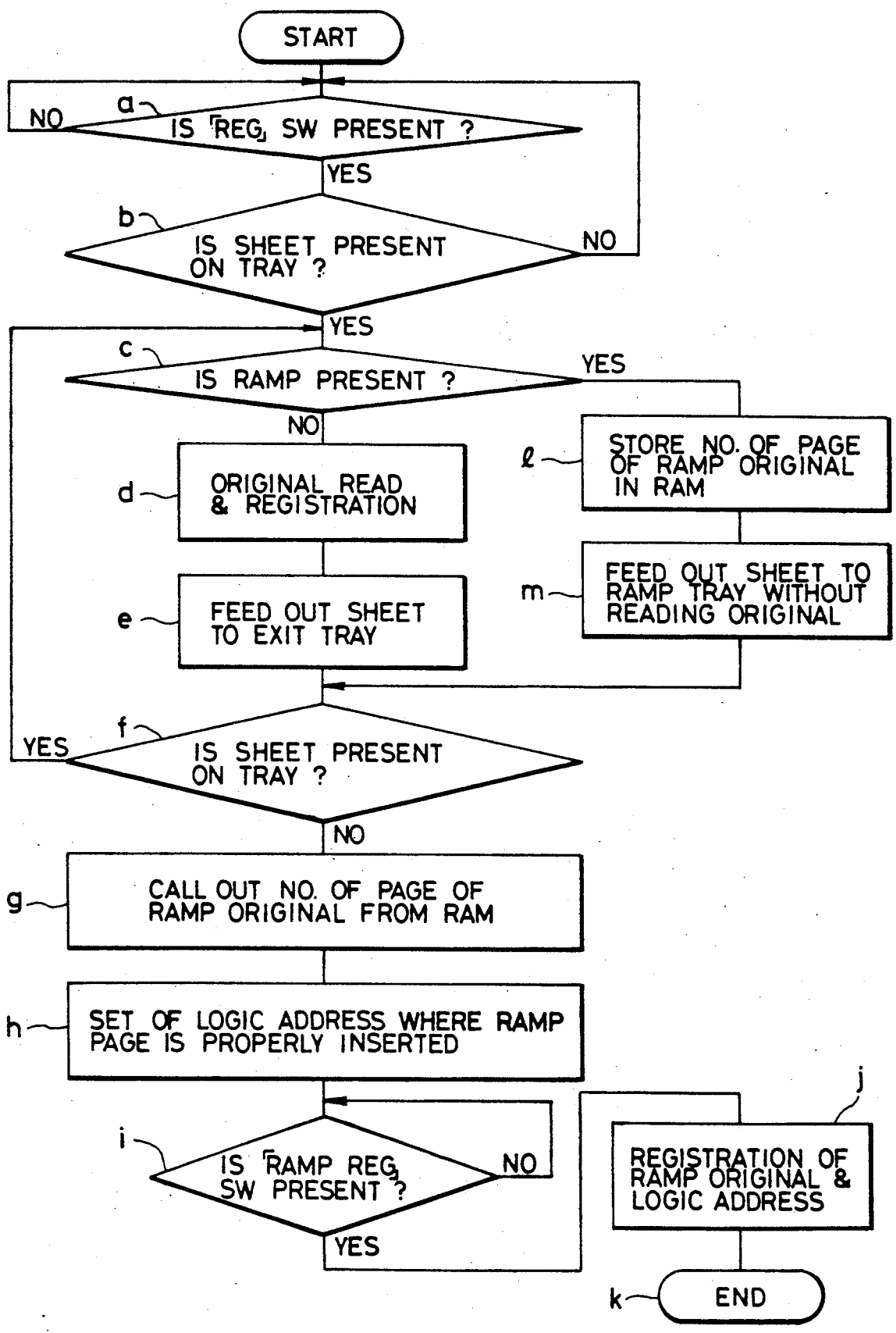

Now reference is made to a flow chart shown in FIG. 9 for explaining an example of controlling the original storage according to the present invention.

In said flow chart, when a start signal is given from the registration switch 819 to the central control circuit 801 in a step (a) after the start of operation, the central control circuit 801 repeatedly identifies, in a step (b), the presence of originals on the original stacker tray 1 by means of a signal from the sheet sensor switch 11 transmitted through the control line 802.

For each original detected, a step (c) is conducted to discriminate whether a signal for skew original is given from the skew original detecting circuit 806 through the control line 807.

Then, unless a skew original is detected, a step (d) is conducted to read the original by the original reader unit 809 as explained before, to transmit thus obtained image information through the image data bus 812 to the image area administering unit 813 of the optical disk device D and to record or register said information on the optical disk 817. The image data recorded on said optical disk 817 are immediately regenerated for verifying the absence of eventual errors in recording, and the program proceeds to a step (e) in the absence of error.

After the completion of data registration, a storage completion signal is released in a step (e) through the control line 804, and in response the automatic sheet original feeder discharges the registered original to the tray 10 and the original reader unit 809 transmits the label data relating to said registered original through the control line 811 to the label area administering unit 814 for counting and recording page number etc.

In the case that a skew original is identified in the step (c), the program proceeds to a step (l) in which, in response to the skew detection signal transmitted from the skew original detecting circuit 806 through the control line 807, the label area administering unit 814 calculates label data such as the position, page number etc. of said skew original and temporarily stores said data in the RAM 816 through the data bus.

Then a step (m) discharges the skew original to the tray 6 without image reading thereof. In this state the skew detection signal supplied from the skew original detecting circuit 806 through the control line 807 is also transmitted to the control circuit 803, whereby the control circuit 803 controls the tray selecting circuit 805 through the control line 821 to move the tray selector plate 9, thus guiding the skew original to the tray 6, and to return said selector plate 9 to the original position.

The above-explained original registering operation is repeated for each original presence signal received by the central control circuit 801 in a step (f) from the sheet sensor switch 11, until said central control circuit 801 identifies, through the control line 802, that the original is no longer present on the original stacker tray 1. The feeding of the original may be conducted simultaneously with the discharge of the registered original, or may be conducted at a variable timing according to the size of the original. Such variable timing allows reduction of the original jamming even in long-sized originals and to achieve secure exchange of the originals.

In a succeeding step (g), the central control circuit 801 controls the label area administering unit 814 through the control line 822 to read the label data on the skew originals from the RAM 816, and a step (h) determines the sequence of the physical sectors for inserting the image data of the skew originals in the correct order of pages, as already explained in relation to FIG. 6(D).

Then, in a step (i), in response to the actuation of the skew registration switch 820, the operator shifts the skew originals from the discharge tray 6 to the original stacker tray 1, and the central control circuit 801 then releases a start signal to initiate the image reading operation for such skew originals in the same manner as for the normally fed originals.

A succeeding step (j) registers the image data and label data of said skew originals respectively in the physical sector and logic sector, and a step (k) terminates the storage and registration for the serial originals.

In the following there will be explained a case in which a similar control is conducted for doubly fed originals. In this case there is employed a pair of the infrared emitter 8 and infrared sensor 7 shown in FIG. 2 for detecting logarithmic change in the transmission of light through the original when it passes between the infrared emitter 8 and infrared sensor 7, and the presence of doubly fed originals is identified if said change exceeds a determined value.

Figure 3:
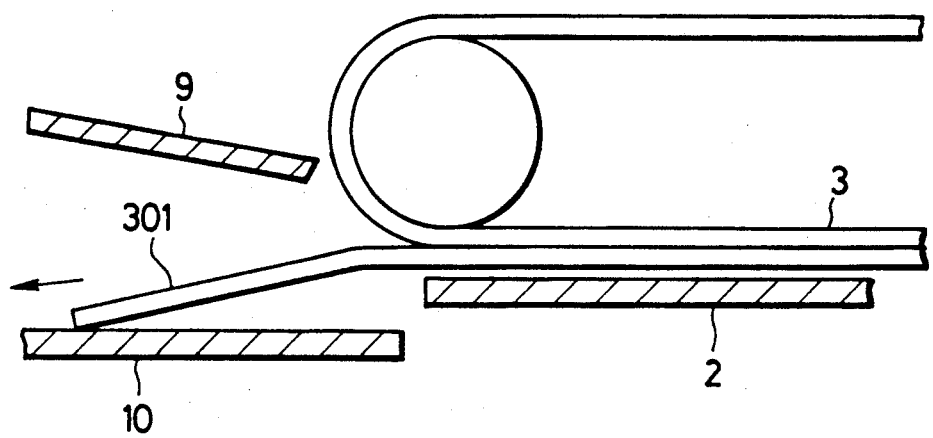
FIGS. 3 and 4 are schematic cross-sectional views showing the mode of original feeding in said embodiment.

In the course of normal feeding of originals where said change in light transmission does not exceed said determined value, the tray selector plate 9 is positioned high as illustrated in FIG. 3, so that the normally fed original 301 is discharged to the tray 10. On the other hand, in case double feeding of originals is detected, such doubly fed originals are not subjected to the image reading operation but are guided to the original inverter unit 5 along the tray selector plate 9 which is lowered to the position shown in FIG. 4, and are finally stacked in the order of occurrence of double feedings, with the image bearing faces upwards, on the sheet discharge tray 6 positioned on the original setter unit B.

Figure 10:
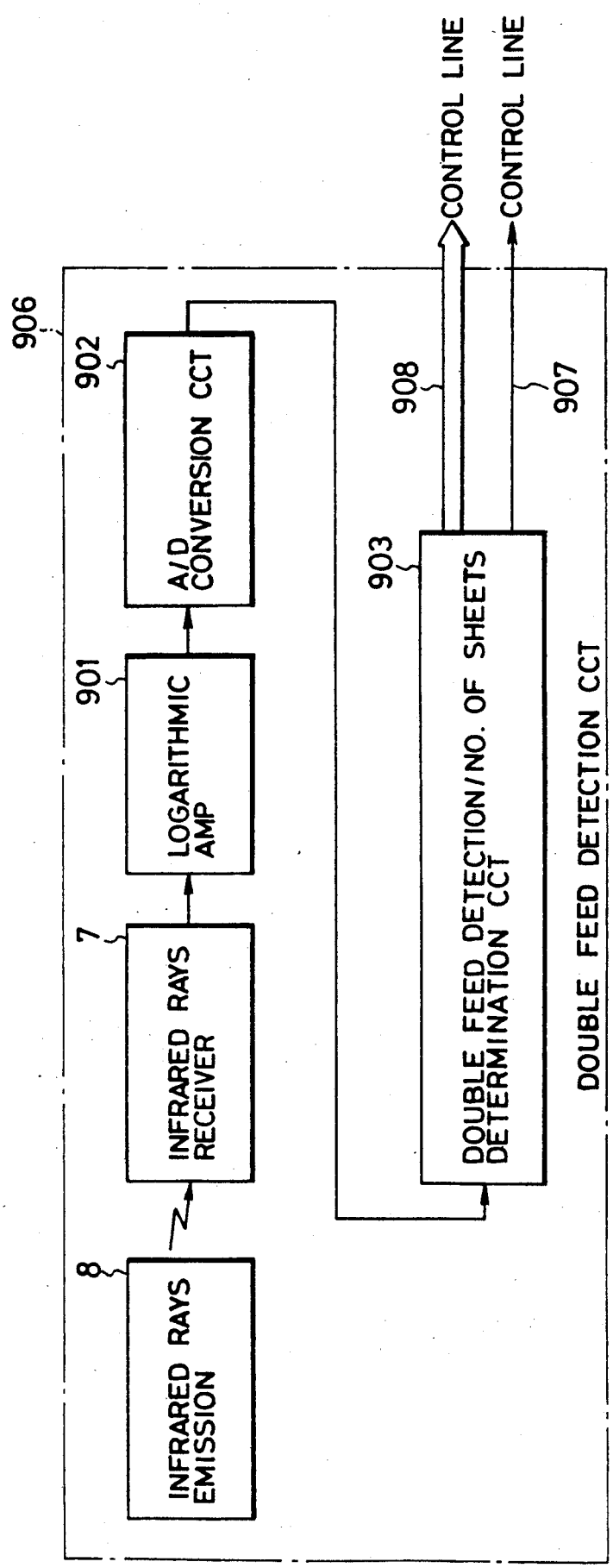
FIG. 10 is a block diagram showing an embodiment of a double feed detecting circuit.

FIG. 10 shows an embodiment of a circuit for detecting double feeding and counting the number of such occurrences according to the present invention. The infrared emitter 8 and the infrared sensor 7 positioned across the original transport path are composed of an element emitting infrared light of high transmission and a high-sensitivity sensor with a peak sensitivity in the infrared wavelength range, and the output signal of said infrared sensor 7 in response to the light from the emitter 8 is exponentially inversely proportional to the number of sheet originals simultaneously passing therebetween. Said output signal is corrected, in a logarithmic amplifier 901, to a linear output signal, which is guided through an A/D converter 902, to a double feed detecting/counting circuit 903 for identifying the presence of double feed and counting the number of originals involved in said double feed. Then the result of such identification is transmitted to other circuits through the control lines 901, 908.

Now reference is made to FIG. 11(A)–(D) for explaining the mode of image data processing in the present invention in case a double feeding is detected in the course of continuous feeding or serial originals. As an example, in case of feeding a series of originals (1)–(16) shown in FIG. 11(A) in succession for image reading by the two-dimensional image reader and storage in an optical disk, if a double feed 1001 of the originals (4), (5) and another double feed 1002 of the originals (10), (11), (12), occur as shown in FIG. 11(B), these originals are not subjected to the image reading operation but are stacked on the sheet discharge tray 6 in the order of occurrence of such double feeds. Consequently the physical sector group 1003 of the optical disk stores the image data of the serial originals except the above-mentioned originals (4), (5), (10), (11) and (12) in the physical sectors 0–9 and A, while the physical sectors B–F are left vacant.

When the image storage for serial originals is completed in the above-explained manner, the originals (4), (5), (10), (11) and (12) stacked on the discharge tray 6 because of the double feeding are transferred to the original stacker tray 1 and are subjected to the transport operation for repeating the above-explained original reading operation. Thus the originals (4), (5), (10), (11) and (12) are stacked on the discharge tray 10, in a vacancy 1004 on top of the already read originals as shown in FIG. 11(C), and the corresponding image data are respectively stored in the physical sectors B–F.

Consequently, in the case of retrieving the image data of the serial originals (1)–(16), it is possible to obtain said data in the order of pages, even if the order of image reading is distorted by the double feedings, by handling the physical sector group 1005 as if the physical sectors therein store the image data in the illustrated order of addresses.

The mode of storing information such as image data of originals in the optical disk is similar to that in the foregoing case with skew originals and will not therefore be explained further.

Figure 12:
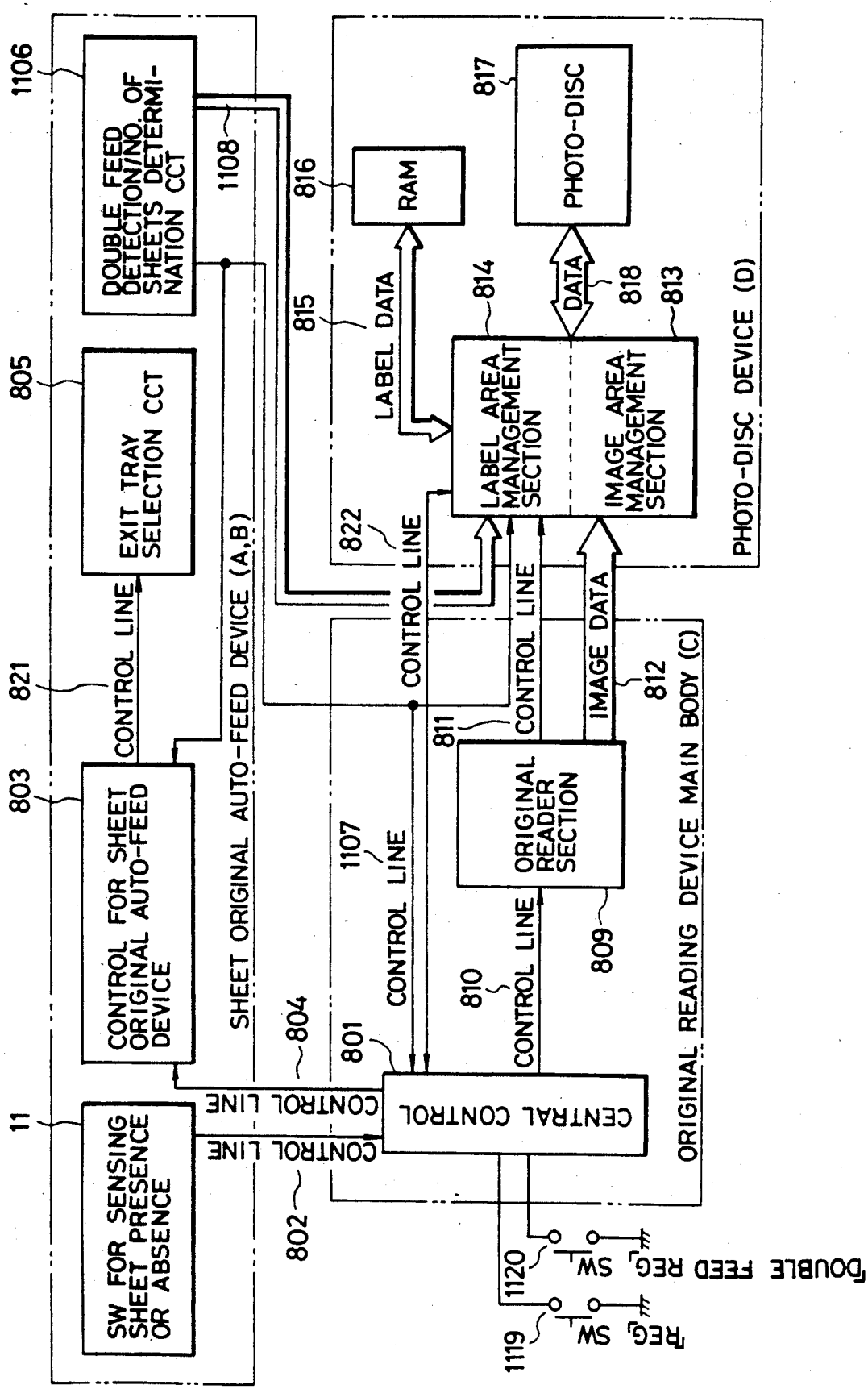

FIG. 12 shows an example of system structure of the present embodiment, in which the same components as those in FIG. 8 are represented by the same numbers and will be omitted from the following explanation.

In FIG. 12 there are shown a double feed detecting and counting circuit 1106; control lines 1107, 1108 from said circuit 1106 to the control circuit 803 for the automatic sheet original feeder, the central control circuit 801 and the label area administering unit 814; switches 1119, 1120 for initiating the storage operation for the entire originals and doubly fed originals, respectively.

In the above-described automatic original feeding and reading apparatus of the present invention, the central control circuit 801 is activated by the registration 1119 or the double feed registration switch 1120 to control the automatic sheet original feeder A, B and the original reader unit C in response to the signal from the sheet sensor switch 11. Thus the image data obtained reading the originals fed in succession are transmitted to the image area administering unit 813 of the optical disk device D and stored in succession on the recording medium of the optical disk.

At the same time, in response to detection signals from the doubly fed original detecting and counting circuit 1106, the sheet discharge tray selecting circuit 805 is controlled to separate the doubly fed originals only. Then, after the image reading and storage are completed for the serial originals, the same operation is conducted for such doubly fed originals as already explained in relation to FIGS. 11(A)–(D), thus storing the image data of such doubly fed originals in the order of image reading. The label area administering unit 814 controls address data of said storage in such a manner that the retrieval of the image data from the optical disk can be made in the order of pages.

Now reference is made to a flow chart shown in FIG. 13 for explaining an example of controlling the original storage according to the present invention.

In said flow chart, when a start signal is given from the registration switch 1119 to the central control circuit 801 in a step (a) after the start of operation, the central control circuit 801 repeatedly identifies, in a step (b), the presence of originals on the original stacker tray 1 by means of a signal from the sheet sensor switch 11 transmitted through the control line 802.

For each original detected, a step (c) is conducted to discriminate whether a signal for double feeding is given from the double feed detecting circuit 1106 through the control line 1107.

Then, unless a double feeding is detected, a step (d) is conducted to read the original by the original reader unit 809 as explained before, to transmit thus obtained image data through the image data bus 812 to the image area administering unit 813 of the optical disk device D and to record or register said data on the optical disk 817. The image data recorded on said optical disk 817 are immediately regenerated for verifying the absence of eventual errors in recording, and the program proceeds to a step (c) in the absence of error.

In a succeeding step (e), the registered original is discharged to the tray 10, and the original reader unit 809 transmits label data concerning said original to the label area administering unit 814 through the control line 811 for page number counting and recording.

In case a double feed is identified in the step (c), the program proceeds to the step (l) in which, in response to the double feed detection signal transmitted from the double feed detecting circuit 1106 through the control line 1107, the label area administering unit 814 calculates label data such as the position, page number and number of doubly fed originals and temporarily stores said data in the RAM 816 through the data bus 815.

Then in a step (m), the doubly fed originals are discharged to the tray 6 without image reading. In this state the double feeding detection signal supplied from the double feeding detecting circuit 1106 through the control lines 1107, 1108 is also transmitted to the control circuit 803 for the automatic sheet original feeder, whereby said control circuit 803 controls the tray selecting circuit 805 through the control line 821 to move the tray selector plate 9, thus guiding the doubly fed originals to the tray 6, and to return said selector plate 9 to the original position.

The above-explained original registering operation is repeated for each original presence signal received by the central control circuit 801 in a step (f) from the sheet sensor switch 11, until said central control circuit 801 identifies, through the control line 802, that the original is no longer present on the original stacker tray 1. The exchange of originals may be conducted at a timing as explained before.

In a succeeding step (g), the central control circuit 801 controls the label area administering unit 814 through the control line 822 to read the label data on the doubly fed originals from the RAM 816, and a step (h) determines the sequence of the physical sectors for inserting the image data of the doubly fed originals in the correct order of pages, as already explained in relation to FIG. 11(D).

Then, in a step (i), in response to the actuation of the double feed registration switch 1120, the operator shifts the doubly fed originals from the discharge tray 6 to the original stacker tray 1, and the central control circuit 801 then releases a start signal to initiate the image reading operation for such doubly fed originals in the same manner as for the normally fed originals.

A succeeding step (j) registers the image data and label data of said doubly fed originals respectively the physical sector and logic sector, and a step (k) terminates the storage and registration for the serial originals.

In the following there will be explained a case in which the image data of five two-side originals are read with the use of an automatic sheet original feeder and are stored in an optical disk which stores information as shown in FIG. 7. It is assumed that the front and back pages of each of five originals 1-5 are numbered in sequence as shown in FIG. 14(A).

Despite of such page sequence, in the automatic feeding of originals, the image reading is at first conducted only on the front pages (a) of the serial two-sided originals 1-5, and then on the back pages (b) thereof, and the image data obtained by said image reading are stored on the optical disk in the order of such reading. Consequently, sequential physical sectors 1-10 store the image data of the front and rear pages as shown in FIG. 14(B). Thus the image data can be retrieved in the order shown in FIG. 14(B) if they are regenerated in the order of the addresses of the physical sectors.

However, according to the present invention, simultaneously with the registration of the image data of front and rear pages of the originals 1-5 in the physical sectors in the order shown in FIG. 14(B), label data or page information such as page number and distinction of front or rear page are stored in the sequential logic sectors 1-10, and the physical sectors storing said image data and the logic sectors storing page information are mutually correlated as shown in FIG. 14(C).

Therefore, in retrieving the image data of serial two-sided originals from the optical disk, it is rendered possible to obtain said image data in the order of pages by retrieval according to the page information recorded in the logic sectors.

Figure 15:
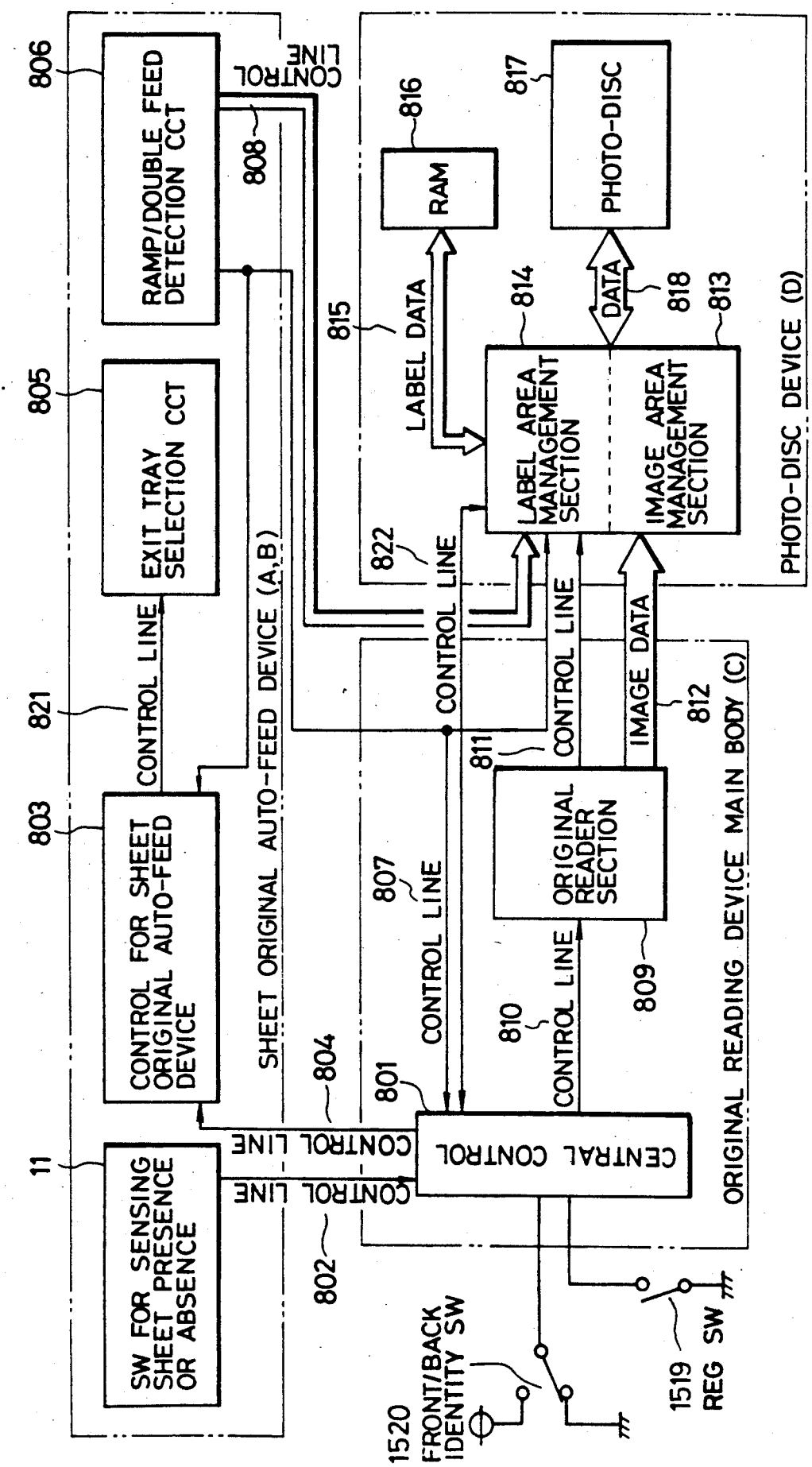
FIG. 15 is a block diagram showing an automatic original registering device according to the present invention.

FIG. 15 shows an example of circuit structure of the present embodiment, which additionally comprises a front/back identification switch in the circuit shown in FIG. 8. More specifically there are provided switches 1519, 1520 for respectively initiating a registering operation for the entire originals and a front-and-back registering operation for two-sided originals.

In the course of above-described automatic original reading operation, in response to a front/back identification signal from the switch 1520, the central control circuit 801 transmits a front-back identification signal for an original in registering operation to the label area administering unit 814 through the control line 822, whereby the address information of the logic sectors in the order shown in FIG. 14(C) is prepared from the count information supplied from the original reader unit 809 through the control line 811 and stored in the logic sectors of the optical disk corresponding to the image data stored in the physical sectors thereof in the order shown in FIG. 14(B).

The above-described procedure allows automatic registration of two-sided originals with an automatic sheet original feeder.

FIG. 16 is a flow chart showing the mode of control for the above-described procedure.

After the automatic original feeding and reading apparatus is activated in a step S0, a step S1 effects an original feeding in response to the signal from the sheet sensor switch 11. A succeeding step S2 counts the page, and, after the image data of the original is read, a step S3 identifies whether said image data belong to a front or back page from the signal of the front/back identification switch 1520. In the case of a front page or a back page, the program respectively proceeds to a step S4 or S5 for preparing address information of a front or back page to be stored in the logic center.

Said address information is registered in a logic sector in a succeeding step S6. A step S7 discriminates, from the signal from the sheet sensor switch 11, whether the image reading of originals has been completed, and, if not, the program returns to step S1 to feed a succeeding original. On the other hand, if the original reading has been completed, a step S8 discriminates the presence of skew or double feeding. If such incomplete feeding is present, a step S9 effects a re-registration and the program proceeds to a step S10. On the other hand, if the original feeding is normal, the program directly proceeds to the step S10, thus terminating the procedure.

What is claimed is:

1. An image file system comprising:
feed means for sequentially feeding a plurality of originals one-by-one to a predetermined position;
detection means for detecting an abnormality in the feeding of an original fed by said feed means;
reader means for reading image data from the originals fed to said predetermined position, and for outputting the image data;
first memory means for storing the image data outputted from said reader means, said first memory means being provided with a plurality of storage areas for storing the image data of the plurality of originals;
second memory means for storing data related to an array sequence of the image data stored in the plurality of storage areas of said first memory means;
control means for controlling said reader means so as to read the image data from the plurality of originals which are sequentially fed by said feed means to said predetermined position;
management means for controlling said first memory means and said second memory means in such a manner that said first memory means sequentially stores in the plurality of storage areas thereof the image data sequentially outputted from said reader means and said second memory means stores the data related to the array sequence of the image data stored in the plurality of storage areas of said first memory means;
enabling means for enabling an original subjected to an abnormality in the feeding to be again read by said reader means after completion of reading for the plurality of originals, in the event that said detection means has detected an abnormality in the feeding of an original while said feed means sequentially feeds the plurality of originals; and
third memory means for storing data related to a page sequence of the original subjected to an abnormality in the feeder, wherein said management means causes said first memory means to store in a storage area thereof the image data of the original subjected to the additional reading by said reader means, sets the data related to said array sequence based on the data stored in said third memory means so that the image data of the plurality of originals stored in the plurality of storage areas of said first memory means can be taken out in a predetermined page sequence, and causes said second memory means to store the thus set data therein.

2. An image file system according to claim 1, wherein said abnormality in feeding is double feeding of originals.

3. An image file system according to claim 1, wherein said abnormality in feeding is skew feeding of an original.

4. An image file system according to claim 1, wherein said control means controls said reader means in response to an output of said detection means so as to control a reading of the original subjected to an abnormality in feeding.

5. An image file system according to claim 4, wherein said control means is adapted to prohibit the image reading operation of image data of the abnormally fed original.

6. An image file system according to claim 1, wherein said memory means comprises an optical disk.

7. An image file system according to claim 1, further comprising discrimination means for generating discrimination data for discriminating whether the image data read by said reader means is data related to a front side of an original or data related to a back side of an original, and wherein said management means causes said second memory to store therein said discrimination data.

8. An image file system comprising:
feed means for automatically feeding originals to a predetermined position;
discharge means for discharging the originals from said predetermined position;
reader means for reading image data of the originals fed to said predetermined position, and for outputting that image data;
memory means for storing the image data outputted from said reader means, said memory means being capable of storing the image data of plural page originals and in addition storing control information for each page of the plural page originals; and
control means for controlling said discharge means so as to discharge each original from said predetermined position in response to completion of storage of the image data of that original into said memory means.

9. An image file system according to claim 8, wherein said memory means comprises an optical disk.

10. An image file system according to claim 9, wherein said control means is adapted to regenerate the image data stored in said optical disk for verifying an absence of errors in storage, and, in the absence of errors, to discharge the original from said predetermined position.

11. An image file system according to claim 8, wherein said control means is adapted to control said feed means in such a manner that the feeding of a succeeding original is initiated in synchronization with the discharge of an original from said determined position.

* * * * *

UNITED STATES PATENT AND TRADEMARK OFFICE
CERTIFICATE OF CORRECTION

PATENT NO. : 5,003,627

DATED : March 26, 1991

INVENTOR(S) : Masafumi Wataya, et al.

It is certified that error appears in the above-identified patent and that said Letters Patent is hereby corrected as shown below:

Column 1

Line 40, "an" should be deleted.

Column 2

Line 25, "Fig. 2" should read --¶ Fig. 2--.
    Line 26, "Figs. 3" should read --¶ Figs. 3--.
    Line 28, "Fig. 5" should read --¶ Fig. 5--.
    Line 31, "Figs. 6(A)" should read --¶ Figs. 6(A)--; and "Fig. 11(A)" should read --Figs. 11(A)--.

Column 4

Line 17, "Fig. 6(A)" should read --Figs. 6(A)--.
    Line 66, "sectors 701," should read --sector 701,--.

Column 5

Line 19, "unit (c);" should read --unit (C);--.

UNITED STATES PATENT AND TRADEMARK OFFICE
CERTIFICATE OF CORRECTION

PATENT NO. : 5,003,627
DATED : March 26, 1991
INVENTOR(S) : Masafumi Wataya, et al.

It is certified that error appears in the above-identified patent and that said Letters Patent is hereby corrected as shown below:

Column 7

Line 67, "Fig. 11(A)-(D)" should read --Figs. 11(A)-(D)--.

Column 8

Line 53, "tion 1119" should read --tion switch 1119--.

Column 10

Line 11, "the" should read --to the--.
    Line 21, "of" should be deleted.

Signed and Sealed this

First Day of December, 1992

Attest:

DOUGLAS B. COMER

*Attesting Officer*     *Acting Commissioner of Patents and Trademarks*